United States Patent
Avitan

[11] Patent Number: 6,050,770
[45] Date of Patent: Apr. 18, 2000

[54] STABILIZATION SYSTEM FOR LOAD HANDLING EQUIPMENT

[75] Inventor: Isaac Avitan, Sioux City, Iowa

[73] Assignee: Schaeff Incorporated, Sioux City, Iowa

[21] Appl. No.: 08/821,963

[22] Filed: May 30, 1997

[51] Int. Cl.[7] ................................. B66F 9/06
[52] U.S. Cl. ................ 414/636; 187/242; 212/277
[58] Field of Search ......................... 414/631, 636; 212/277; 280/402; 187/242

[56] References Cited

U.S. PATENT DOCUMENTS

| | | | |
|---|---|---|---|
| 2,774,437 | 12/1956 | Remde | 180/282 |
| 3,824,578 | 7/1974 | Harders | 212/277 |
| 3,841,493 | 10/1974 | Jackson . | |
| 3,993,166 | 11/1976 | Senour . | |
| 4,206,829 | 6/1980 | Medocik | 414/631 |
| 4,221,530 | 9/1980 | Williams et al. | 180/285 |
| 4,231,450 | 11/1980 | Hedtke et al. | 180/282 |
| 4,895,262 | 1/1990 | Maso | 212/277 |
| 5,105,896 | 4/1992 | Kyrtsos . | |
| 5,131,801 | 7/1992 | Melanson . | |
| 5,224,815 | 7/1993 | Abels . | |
| 5,409,346 | 4/1995 | Grether | 180/282 |

FOREIGN PATENT DOCUMENTS

| | | | |
|---|---|---|---|
| 1258081 | 12/1971 | United Kingdom | 414/636 |
| 2097959 | 11/1982 | United Kingdom | 414/636 |

*Primary Examiner*—Thomas J. Brahan
*Attorney, Agent, or Firm*—Natter & Natter

[57] ABSTRACT

A processor implemented stabilization system for load handling equipment monitors at least a portion of the equipment weight load at an equipment support member. Reduction below or increase above predetermined values signals an approaching tip over condition and triggers alarm condition responses for stabilization of the equipment. In a counterbalanced lift truck, the equipment weight load on a rear steer wheel is carried by an outer bearing race of a spindle and is transferred from the race to a load cell which is positioned between the race and a shoulder of a mounting tube. The load cell output is received at a processor which monitors the cell to determine if there is an approaching longitudinal tip over condition (toward or away from the load) as well as a lateral tip over condition. Upon sensing an approaching tip over condition, the processor implements one or more corrective measures such as actuation of an annunciator, preventing an increase in vehicle speed, preventing elevation of the load, preventing mast tilt, etc.

7 Claims, 7 Drawing Sheets

STABILIZATION SYSTEM FOR LOAD HANDLING EQUIPMENT

BACKGROUND OF THE INVENTION

1. Field of the Invention

This invention deals with load handling equipment and more particularly with a system for sensing an approaching tip over condition.

2. Antecedents of the Invention

Of paramount significance in the design of load handling equipment were safety considerations including equipment stability over a range of operating conditions, both loaded and unloaded.

Although each piece of load handling equipment was rated for a maximum work load, the fact that the equipment load was within the rated weight load range did not constitute a guarantee of stability. This was because numerous additional parameters affected stability of the equipment. For example, if a load within the maximum load weight range was loaded off center, i.e. with a center of gravity displaced forwardly of a load moment axis, beyond a rated distance, or if the load center of gravity was displaced laterally from the longitudinal equipment axis, such as when a side shifter was employed, a determination that the load weight was within the specified range did not alone assure that safe equipment operation without tip over resulted. In lift trucks, additional factors such as mast tilt angle, mast load elevation, vehicle support surface slope, i.e. ramp incline, vehicle acceleration or deceleration, centrifugal force, etc. all constituted significant additional factors affecting stability.

Although systems have been devised for determining load weight, such as that disclosed in U.S. Pat. No. 5,105,896, knowledge of the load weight alone was insufficient. In U.S. Pat. No. 3,841,493, the load moment in a crane having an elongate boom was monitored by sensing the hydraulic pressure differential in a hydraulic cylinder employed to support the boom. Knowledge of the load moment alone was not sufficient to assure equipment stability, however, due to the many other variable factors which affected the dynamic interaction between load moment and equipment counterbalance moment.

It has also been proposed to detect an overload condition of a fork lift vehicle by utilizing a strain guage in a mounting bracket of a tilt cylinder, as disclosed in U.S. Pat. No. 3,993,166. The disclosed system was imprecise and did not provide an assessment of vehicle stability.

U.S. Pat. No. 5,224,815 described a load state monitoring system for a lift truck. The system employed strain gages to sense both horizontal and vertical mast bearing forces on a horizontally spaced pair of pivot bearings. The sum of sensed vertical forces was to correspond to the static load supported by the mast and the sum of the sensed horizontal forces was to correspond to the load moment.

As with the load moment monitoring system of U.S. Pat. No. 3,841,493, detection of the load moment alone was not determinative of equipment stability. Knowledge of the effect of the counterbalance moment was essential in an assessment of stability.

The prior systems did not sense the effects of the instantaneous equipment counterbalance moment which was a function of many variables, such as the weight of the lift truck operator, the employment of auxiliary extension weights on the back of the equipment to increase the load capacity, the angle of incline of the support surface, the elevation of the load, the mast tilt angle, vehicle deceleration or acceleration, centrifugal force, the employment of mast accessories, etc.

Essentially, the previous systems which attempted to guage equipment stability merely employed a deduction process for approximating stability since no assessment was made with respect to the instantaneous counterbalance moment and its effect on stability.

Further, a true stabilization sensing system must recognize when the overall center of gravity is about to be transferred to a point outside of a polygon defined by the contact points between support members, e.g. wheels, and a support surface.

Prior systems were unable to recognize a reverse tip over condition, that is, a longitudinal axis tip over in the counterbalance moment direction, which could occur with an elevated load and equipment traversing an upwardly sloped ramp, with or without the mast being tilted rearwardly.

Additionally, stabilization systems must also sense and respond to an approaching lateral tip over condition, as a result of centrifugal force, lateral ramp slope or a laterally offset load center of gravity.

Safety standards for lift trucks have been adopted by the American National Standards Institute (ANSI). The standards are entitled "*Safety Standard for Low Lift and High Lift Trucks,* ASME B56.1-1993 copyright 1994, The American Society of Mechanical Engineers.

Part III of ANSI B56.1, entitled "Design and Construction Standards", Section 7.6 et seq. sets forth the stability criteria for lift trucks and standards for measurement of a truck's resistance to overturning under controlled static conditions which include consideration for dynamic factors encountered during equipment operation. The testing criteria recognized factors which influenced stability including load weight, weight distribution, wheel base, wheel tread, method of suspension, truck speed, as well as tire and mast deflection under load.

Different stability tests have been established for counterbalanced lift trucks (Section 7.7), narrow aisle high lift trucks (Section 7.8), high lift order picker trucks (Section 7.9), counterbalanced front/side loader lift trucks (Section 7.10) and single sided loader lift trucks (Section 7.11).

All of the tests involved placing the equipment on a tilting platform which comprised a rigid flat surface and tilting the platform to the slope specified for each of the required tests. The truck was considered stable if it did not physically overturn when the test platform was tilted to the specified slope values.

For counterbalanced lift trucks, the platform tests for longitudinal stability included a stacking test, with the mast raised and forks carrying a test load, as well as a test simulating travelling conditions, with the test load being lowered and the mast rearwardly tilted. Lateral stability tests for counterbalanced lift trucks included a stacking test with a test load carried in the mast uppermost position and rearwardly tilted as well as a travelling test without a load.

It was evident that prior systems for detecting a potential tip over condition, which assessed stability as a function of either the load weight or the load tip over moment, merely served to deduce a possible approaching equipment tip over state, since the variable factors affecting the counterbalance moment and other equipment stability considerations were not taken into account.

SUMMARY OF THE INVENTION

In compendium, the invention comprises a stabilization system for load handling equipment. The system senses a normal component vector of equipment weight carried by a support member. The support member is spaced longitudinally from a transverse pivot axis of a load tip over moment, e.g. a mast pivot axis. The sensed equipment weight component carried by the support member decreases as a function of increasing tip over moment and counterbalance moment and represents a measure of equipment stability.

When the support member, such as a rear steer wheel, bears no load component, any increase in the tip over moment will no longer generate an increase in the counterbalance moment and will cause the support member to lift from the support surface. Further increase in tip over moment will cause the equipment to tip over.

Conversely, an increase in the sensed equipment weight load component beyond a maximum value signals reverse instability caused by a transfer of the load center of gravity toward and beyond the moment axis.

The normal component vector of equipment weight at the support member is sensed by a transducer such as a load cell. The load cell may comprise an annulus positioned within a steer wheel vertical spindle support. The axial load on the spindle is transferred through a bearing race to the load cell which is between the race and a thrust shoulder within the spindle support.

A processor monitors the transducer. If an approaching tip over condition is sensed, the processor automatically implements corrective steps including operator alarm annunciator actuation, selective disablement of load elevation function, selective disablement of mast tilt function, and disablement of auxiliary functions such as a side shifters.

From all of the foregoing, it will be appreciated that it is a consideration of the present invention to provide a stabilization system of the general character described for load handling equipment which is not subject to the disadvantages of the antecedents of the invention.

A feature of the present invention is to provide a stabilization system of the general character described for load handling equipment which provides an assessment of equipment stability by monitoring the status of an equipment weight component at a support, rather than monitoring the load moment of the equipment.

An aspect of the present invention is to provide a stabilization system of the general character described for load handling equipment which provides a true measure of stability regardless of variations in a variety of stability factors including the longitudinal slope or incline of a support surface.

A further consideration of the present invention is to provide a stabilization system of the general character described for load handling equipment which is responsive to instability factors attributable to the lateral slope or incline of the equipment support surface.

An additional feature of the present invention is to provide a stabilization system of the general character described for load handling equipment which provides an assessment of instantaneous vehicle stability irrespective of load position.

Another aspect of the present invention is to provide a stabilization system of the general character described for load handling equipment which provides an indication of instantaneous equipment stability of a lift truck and which is responsive to instability factors attributable to vehicle acceleration and deceleration.

An additional consideration of the present invention is to provide a stabilization system of the general character described for load handling equipment which includes a transducer for generating a signal representative of a component of equipment weight load at a vehicle support, with the weight load varying as a function of equipment stability.

Yet another aspect of the present invention is to provide a stabilization system of the general character described for load handling equipment which is responsive to changes in the equipment counterbalance moment.

A still further feature of the present invention is to provide a stabilization system of the general character described for load handling equipment which is responsive to lateral instability factors attributable to centrifugal force.

To provide a stabilization system of the general character described for load handling equipment which is responsive to lateral instability factors attributable to a load center of gravity being displaced from the longitudinal equipment axis is another aspect of the present invention.

A still further consideration of the present invention is to provide a method of monitoring load handling equipment stability which overcomes the disadvantages aforementioned.

Yet another feature of the present invention is to provide a method of monitoring load handling equipment stability by monitoring at least a component of the equipment weight load at an equipment support.

Other aspects, features and considerations of the present invention in part will be obvious and in part will be pointed out hereinafter.

With these ends in view, the invention finds embodiment in certain combinations of elements, arrangements of parts and series of steps by which the aforesaid aspects, features and considerations and certain other aspects, features and considerations will be attained, all with reference to the accompanying drawings and the scope of which will be more particularly pointed out and indicated in the appended claims.

BRIEF DESCRIPTION OF THE DRAWINGS

In the accompanying drawings in which are shown one of the various possible exemplary embodiments of the invention.

DESCRIPTION OF THE PREFERRED EMBODIMENT

Referring now in detail to the drawings, the reference numeral 10 denotes generally a counterbalanced lift truck including a stabilization system constructed in accordance with and embodying the invention. The counterbalanced lift truck 10 includes a truck body 12 having a stand up operator station 14. The lift truck 10 is depicted as an electric truck. Accordingly, the body 12 also includes a battery compartment 16.

A mast such as a triplex mast assembly 18 is mounted to a front end of the truck 10. Fixed to a pair of inner rails of the mast assembly 18 is a load engaging carriage 20 having a pair of forks 22 which carry a load 24, depicted schematically in FIG. 1. The carriage may also include a side shifting mechanism or other accessories such as a rotator, a push/pull, a carton clamp, a bale clamp, etc.

Figure 1:
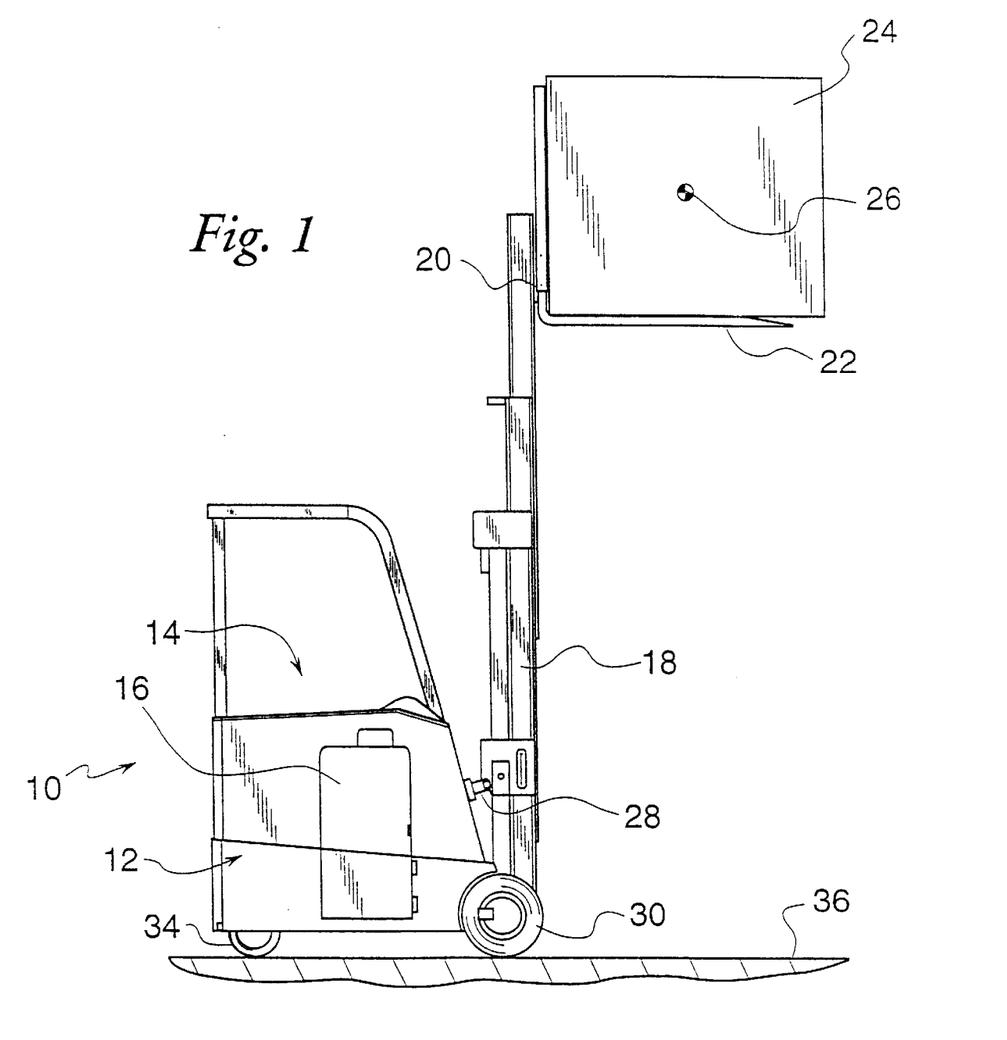
FIG. 1 is a front elevational view of a counterbalanced lift truck carrying a load on a fully elevated mast assembly, with the lift truck having a stabilization system constructed in accordance with and embodying the invention.

The load is illustrated, in exemplary manner, as having a load center of gravity 26. A pair of tilt cylinders 28 interconnect the truck body 12 and the mast assembly 18 to tilt the mast assembly for the purpose of engaging and maneuvering loads.

Figure 2:
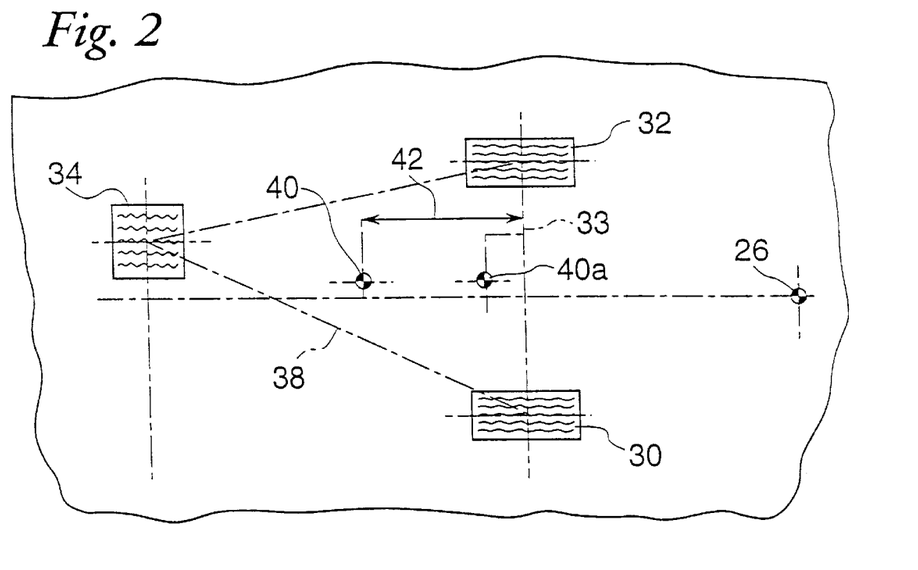
FIG. 2 is a schematized top plan footprint of the truck illustrated in FIG. 1 showing a rear steer wheel and a pair of front drive wheels and showing wheel contact with a support surface, a load center of gravity and the truck center of gravity.

The lift truck 10 includes a pair of forward drive wheels, i.e. a right drive wheel 30 and a left drive wheel 32, illustrated in FIG. 2. The drive wheels 30, 32 rotate about a common transverse axis 33 which may be coincident with the tilt axis of the mast assembly 18. Each drive wheel is engaged by a traction motor (not shown).

The truck 10, with its load 24, is supported above a support surface 36 by the right and left drive wheels 30, 32 as well as a rear steer wheel 34.

With reference now to FIG. 2, wherein a top plan view footprint showing the drive wheels 30, 32 and the steer wheel 34 is found, it should be noted that as a counterbalanced lift truck, all of the load 24, during normal transporting, is external to a polygon, e.g. a triangle 38, formed by the contact points between the wheels and the support surface 36. The triangle 38 also constitutes a stability polygon within which the overall center of gravity, i.e. the combined center of gravity of both the truck 10 and the load 24, must lie for the truck to remain stable.

With reference to the ANSI B56.1 standards for stability of lift trucks, incorporated herein by reference, the stability standards for lift trucks are based upon actual vehicle tip over, that is, the lift truck lifting from the tilt platform at one or more points and overturning.

Naturally, during normal operating conditions the tip over moment, created by the load weight multiplied by the load weight moment arm, i.e. the distance from the actual load center of gravity 26 to the drive wheel axis 33, plays a significant role in equipment stability, however, vehicle stability is dependent upon several additional factors.

With reference to FIG. 2, the load weights at each of the vehicle wheels 30, 32, 34 have been measured. The following values have been recorded with respect to a Schaeff W40 triplex mast electric counterbalanced lift truck, available from Schaeff Incorporated, Sioux City, Iowa, the assignee of the present invention.

With the counterbalanced lift truck having a battery weighing 2900 pounds and a total unloaded weight of 9931 pounds, a wheel base of 51.250 inches, a transverse center to center drive wheel spacing of 35 inches, the unloaded or empty truck center of gravity 40 was spaced a distance of 23.336 inches from the drive wheel axis 33 as denoted by the double arrow 42 and spaced from the longitudinal axis of the lift truck a distance of 1.961 inches.

The unloaded truck weight distribution was measured at 3210 pounds at the right drive wheel 30, 2185 pounds at the left drive wheel 32 and 4536 pounds at the steer wheel.

When a load 24 of 3845 pounds was carried on the forks, the measured weight load on the right drive wheel 30 increased to 5864 pounds; the measured weight load on the left drive wheel 32 increased to 6142 pounds and the measured load on the steer wheel decreased by 2766 pounds to 1770 pounds.

The overall center of gravity 40a of the loaded truck shifted from the original position toward the axis 33 to a new position which was spaced from the axis 33 a distance of 6.581 inches and spaced from the longitudinal axis of the truck 1.414 inches.

Determination of the position of the static overall center of gravity 40a may be made by adding all of the weight components, e.g. truck weight, mast weight, load weight, fork weight, etc. to obtain a total weight value, adding all of the moments, e.g. load weight tip over moment, truck weight moment, etc. and dividing the total weight value by the sum of the moment values.

It is evident that as the weight of the load 24 increases or other parameters affecting tip over moment, e.g. forward mast tilt angle, vehicle deceleration, etc. increase, the tip over moment increases and the weight load at the steer wheel 34 will decrease further to a point wherein the steer wheel 34 bears no load. Further increase in the tip over moment will result in the steer wheel 34 lifting from the support surface 36 and additional increases in tip over moment thereafter will result in the truck 10 tipping over about the axis 33.

Since the tip over moment includes numerous factors in addition to the load weight and load center of gravity, in accordance with the invention, the value of the tip over moment is not utilized to sense an approaching tip over condition rather, the component vector of weight load which is normal to the support surface 36 at one or more vehicle support wheels is monitored to sense that the truck is about to lift from the support surface, which event constitutes an approaching tip over condition.

Figure 6:
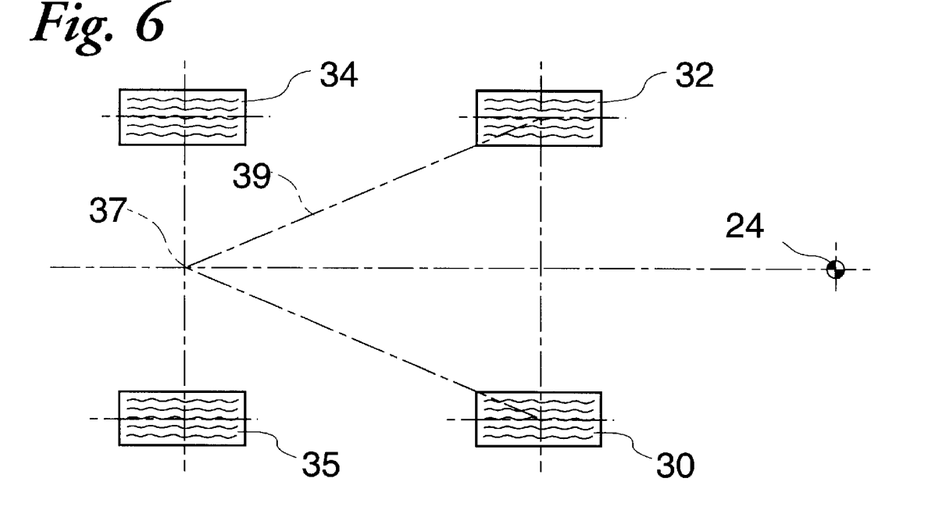
FIG. 6 is a schematized top plan footprint of an alternate lift truck having a pair of rear steer wheels and a pair of front drive wheels.

While the following description refers to monitoring a rear steer wheel of a counterbalanced lift truck, any other equipment support member may be selected in connection with load handling equipment may be selected as the site for monitoring equipment weight for the purpose of sensing an approaching tip over condition. In this regard, the load weight on one or more support legs of a crane, for example, may be monitored to sense an approaching tip over condition. Additionally, with reference to FIG. 6 wherein a truck having a pair of drive wheels 30, 32 and a pair of steer wheels 34, 35 is illustrated, the weight load component of both steer wheels 34, 35 may be simultaneously monitored, by monitoring of suspension components, which bear the weight load. The rear steer wheels 34, 35 articulate about a common pivot point 37 such that the vehicle stability polygon comprises a triangle 39 similar to the triangle 38.

Figure 3:
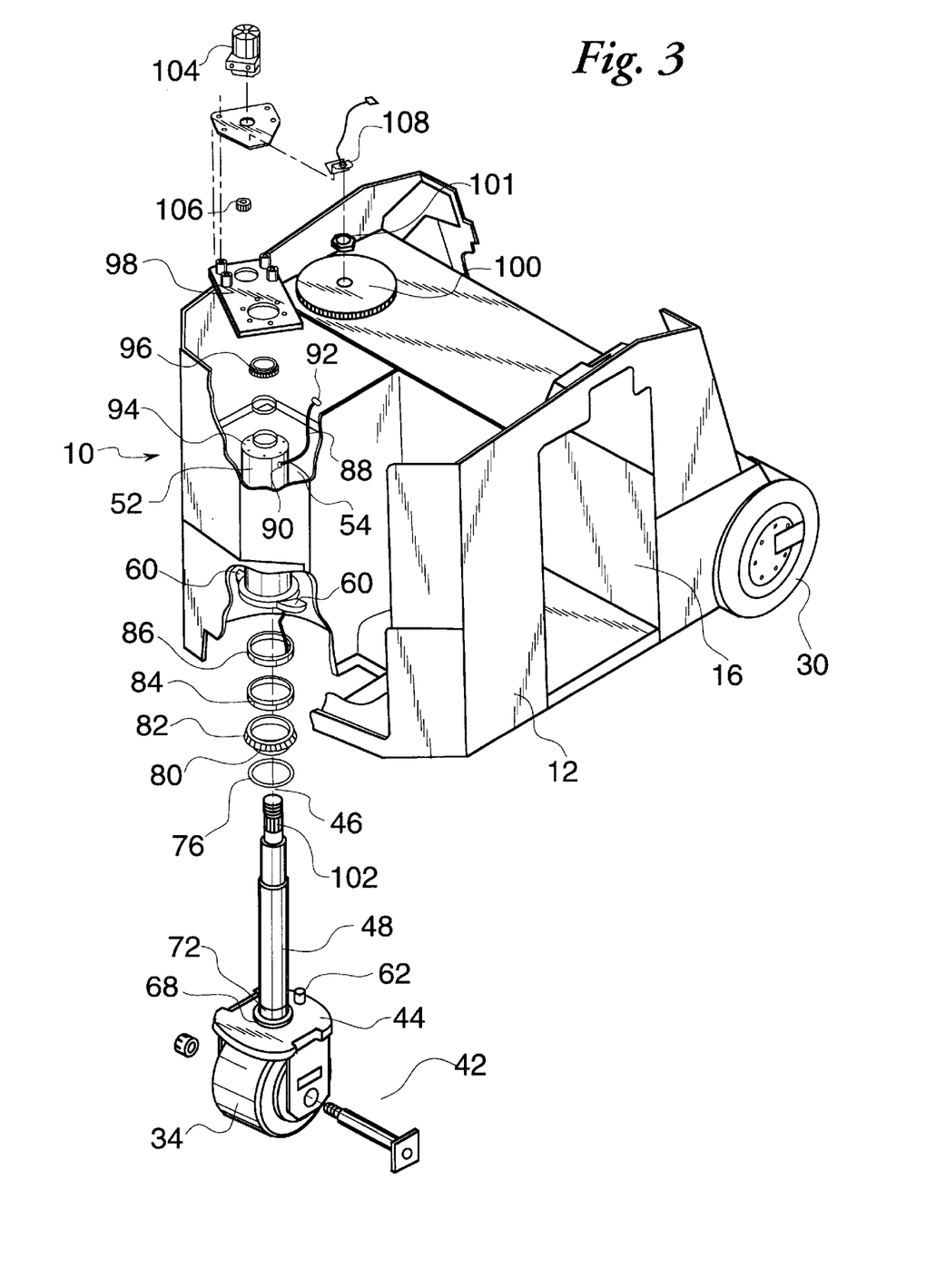
FIG. 3 is a partially exploded isometric view of the lift truck, with portions deleted for clarity and further portions broken away and illustrating a rear steer wheel having a spindle with an axis normal to the support surface, a support tube which carries the spindle and a transducer for monitoring the axial, i.e. normal load on the steer wheel.

With reference now to FIG. 3, it will be seen that the rear steer wheel 34 of the truck 10 rotates about a horizontal axle 42 which extends through registered apertures formed in opposed legs of a yoke 44. Steering of the lift truck 10 is effected by rotating the yoke 44 about a vertical axis 46. For this purpose, a vertical spindle 48 is fixed to a horizontal top of the yoke 44 by a suitable weld 50.

The spindle 48 is received within a support tube 52. The support tube 52 is secured within a solid counterweight steer support chassis 54. At its lower end, the chassis 54 is bonded by a weld 55 to a base plate 56 of the truck and includes an open downwardly facing well 58 which receives the yoke 44 and the steer wheel 32, leaving a lower portion of the steer wheel 32 projecting beneath the base plate 56 to contact the support surface 36.

The support tube 52 includes, at its lower end, a pair of radially projecting limit stops 60 which are engaged by a pin 62 (shown in FIG. 3) projecting from the yoke 44 to limit rotation of the steer wheel about the axis 46. The support tube 52 is received within a cylindrical bore 64 which extends through the chassis 54 and is secured to the chassis 54, at opposite ends of the bore 64, by suitable welds 66.

Figure 5:
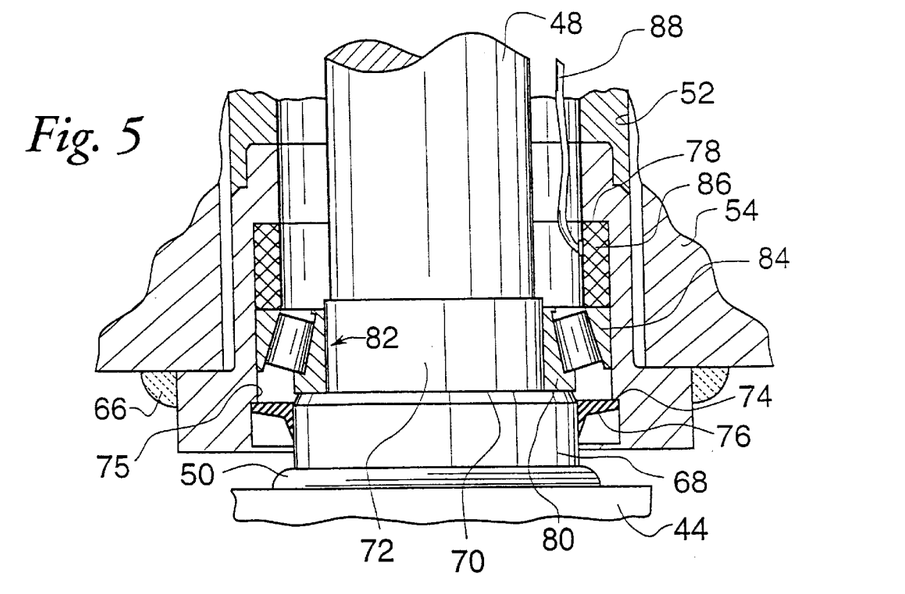
FIG. 5 is an enlarged scale fragmentary sectional view through the spindle and tube assembly and more clearly illustrating a tapered roller bearing, a pair of bearing races and the transducer.

With reference now to FIG. 5, wherein the lower ends of the spindle 48 and the support tube 52 are shown in greater detail, it is noted that a lower cylindrical base portion 68 of the spindle 48 is of an enlarged diameter and includes an upper shoulder 70. From the shoulder 70, an intermediate cylindrical portion 72 of the spindle 48 extends upwardly at a reduced diameter.

The corresponding portions of the support tube 52 comprise a first shoulder 74, which serves as a limit stop for a seal 76 and an interior cylindrical bore 75 which extends upwardly to a thrust load bearing shoulder 78. The bore 75, between the shoulders 74, 78, is of uniform diameter. Seated on the spindle shoulder 70 is an inner race 80 of a tapered roller bearing assembly 82. An outer race 84 of the bearing 82 engages the cylindrical bore 75 of the support tube 52.

Pursuant to the invention, the outer race 84 is not force fit into the bore 75. The fit is only tight enough to prevent rotation of the outer race 84, while permitting the axial thrust load on the spindle 48 to be transferred to the top axial end of the race 84.

In accordance with the invention, positioned between the top axial end of the race 84 and the support tube shoulder 78 is an annular weight load transducer 86 which may comprise a load cell.

It is evident that the load cell 86 is subject to the axial component of the weight load carried by the spindle 48, hence the steer wheel 34. Suitable electrical leads 88 extend through the support tube 52 from the transducer 86 to an opening 90 adjacent an upper end of the tube. An electrical connector 92 is provided at the end of the leads 88 for interconnection with appropriate electrical circuitry as will be shown hereinafter.

Figure 4:
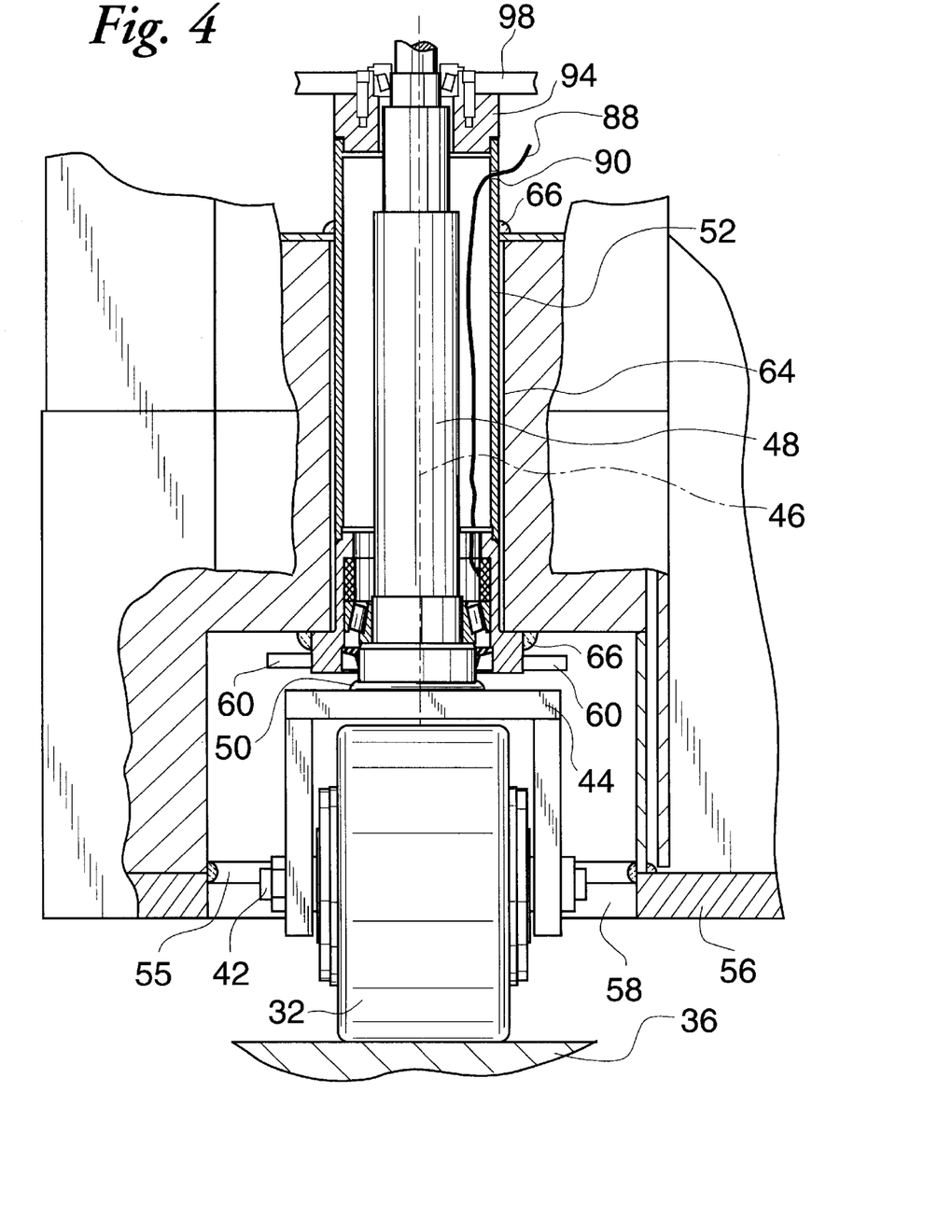
FIG. 4 is an enlarged scale transverse sectional view through the spindle, the support tube, the transducer and related structure of the lift truck.

Mounted across the upper end of the support tube 52 is a solid plate 94 having a reduced diameter bore. A tapered roller bearing assembly 96 is positioned between the bore of the plate 94 and the spindle 48.

A steer motor bracket 98 is bolted to the top of the plate 94 and a spindle pinion 100 having internal teeth is engaged over external teeth 102 formed adjacent the upper end of the spindle 48. A bolt 101 is engaged over a terminal portion of the spindle 48 to retain the pinion 100.

A steer motor 104 is mounted to the bracket 98 and a drive gear 106, fixed to the end of a steer motor output shaft, engages external teeth of the pinion 100 to rotate the spindle 48, hence the yoke 44 and the steer wheel 32 for steering the lift truck 10.

A steer position sensor 108 engages the top of the spindle 48 to provide a signal indicative of the steer wheel position.

With reference again to FIGS. 1 and 2, it will be appreciated that the transducer 86 generates a signal indicative of the axial weight load, i.e. the weight component normal to the plane of the support surface 36. Such signal constitutes a true representative measure of the instantaneous stability of the lift truck 10.

Reduction of the spindle axial below a predetermined value indicates approaching vehicle instability, regardless of the tip over moment component attributable to the load 24. By sensing when the vehicle is about to be lifted from the support surface, the present invention accounts for all variable parameters which affect stability.

Figure 7:
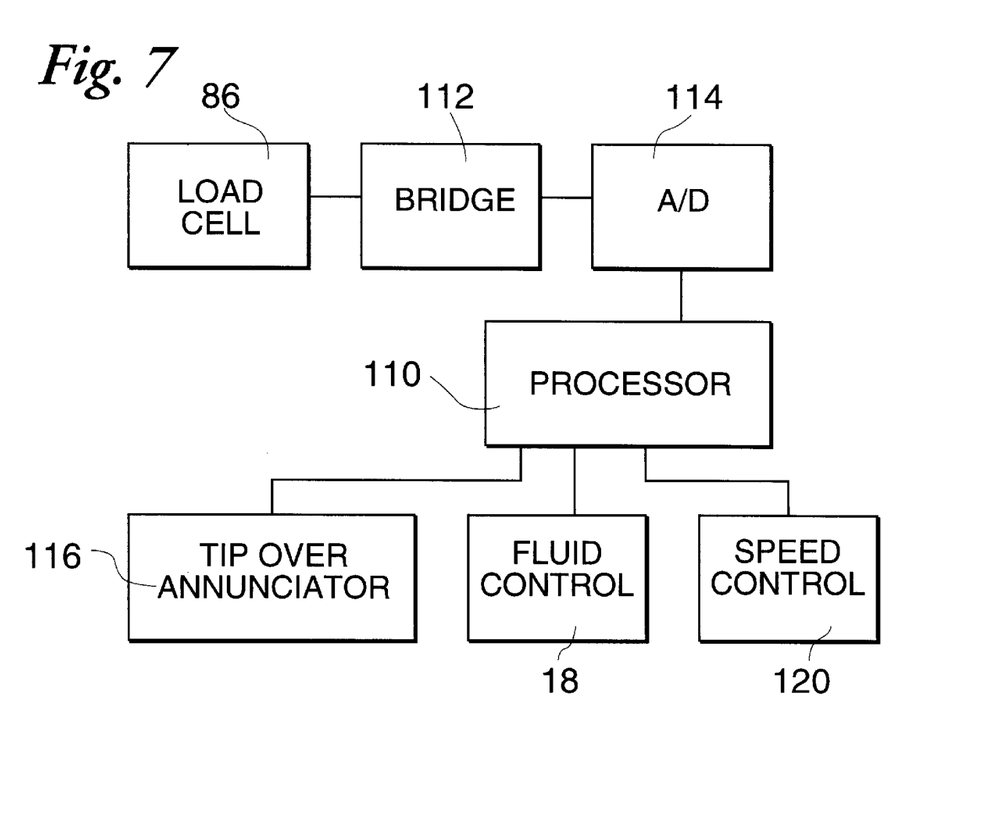
FIG. 7 is a schematized block diagram of a processor implementation of the stabilization system.

Referring now to FIG. 7 wherein a schematized system block diagram showing implementation of the stabilization system in a processor controlled lift truck, a processor 110 is employed to control the overall operation of the truck 10, including the drive motors, as well as hydraulic systems such as mast elevation and tilt controls and mast accessories. The transducer 86, e.g. load cell, varies in electrical resistance as a function of the axial component of the equipment weight load and is employed in a conventional Wheatstone bridge circuit 112, which may comprise a linear bridge circuit using an operational amplifier. The bridge output is received at an analog to digital converter 114 and the digital output of the converter 114 is received at the processor 110.

Upon sensing an approaching tip over condition, the processor 110 will actuate a suitable tip over annunciator 116 which may comprise an audible as well as visual annunciator. Additionally, the processor 110 selectively disables certain of the hydraulic fluid controls 118 to permit operator control of the fluid controlled functions only in a direction which would tend to stabilize the vehicle.

In addition to selective disablement of fluidic controls, the processor, upon sensing an approaching tip over condition, effects stabilizing limitations upon operator throttle selection of the drive motor speed control 120.

Figure 8:
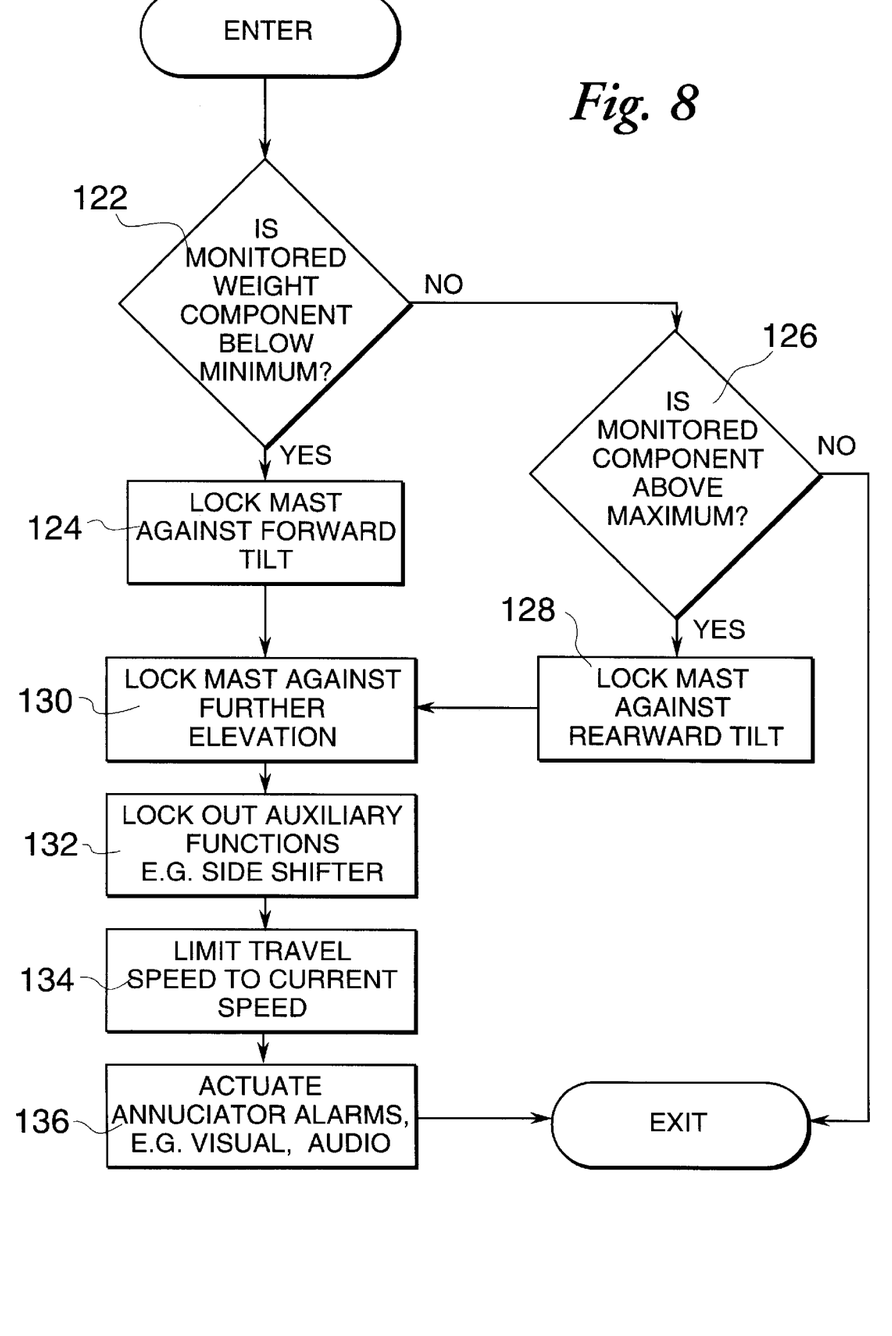
FIG. 8 is a schematized flow chart showing a typical processor routine for stabilization monitoring and implementation of corrective measures upon detection of an approaching tip over condition.

A flow chart depicting various processor implemented steps of a typical routine for the stabilization system, is depicted in FIG. 8.

Upon entering the routine, the processor first inquires as to whether the monitored axial weight component is below the minimum predetermined value as indicated in an inquiry box 122. If the monitored weight component is below the minimum value which is indicative of an approaching forward tip over condition, the processor then proceeds to effect control over the hydraulic fluid control system 118 to lock the mast against forward tilting as indicated in block 124, since further forward tilting tends to increase the tip over moment.

If, on the other hand, the monitored weight is not below the minimum value, the processor then inquires as to whether or not the weight is above the maximum value, which would indicate an approaching reverse tip over condition, as indicated in inquiry box 126. If the monitored weight component is not above the maximum value, the processor exits the routine. If the monitored weight component value is above the maximum, the processor then effects control of the hydraulic system to lock the mast against rearward tilt as indicated in box 128 because further rearward tilting of the mast would increase reverse instability.

After effecting the mast tilt locking function of either block 124 or block 128, the processor then proceeds to lock the mast against further elevation as indicated in block 130, since elevation of the load increases instability.

Thereafter, the processor 110 proceeds to lock out auxiliary functions associated with the mast such as side shifters as indicated in block 132. The processor then effects control over the speed of the drive motors to prevent the operator from increasing the vehicle speed as indicated in block 134. Finally, the processor actuates the operator annunciator 116 comprising audio and/or visual alarm as indicated in block 136 to warn the operator of the approaching condition and allow the operator to effect permitted control operations, e.g. lowering of mast, tilting of mast in permitted direction, maintaining or reducing travel speed, increasing turn radius, etc. to bring the stability within permitted limits. After actuating the annunciator functions as indicated in block 136, the processor exits the routine. The processor 110 reenters the routine to reassess the stability of the vehicle at predetermined time intervals.

It should be appreciated that the order of steps in the routine after the initial inquiry boxes is not critical and may be altered, rearranged or revised. Among the primary aspects of the invention is to provide suitable annunciator actuation to warn the operator to take appropriate corrective measures. In the processor implementation routine illustrated in FIG. 8, additional safeguards have been added to prevent the operator from effecting vehicle control functions which would increase instability.

Figure 9:
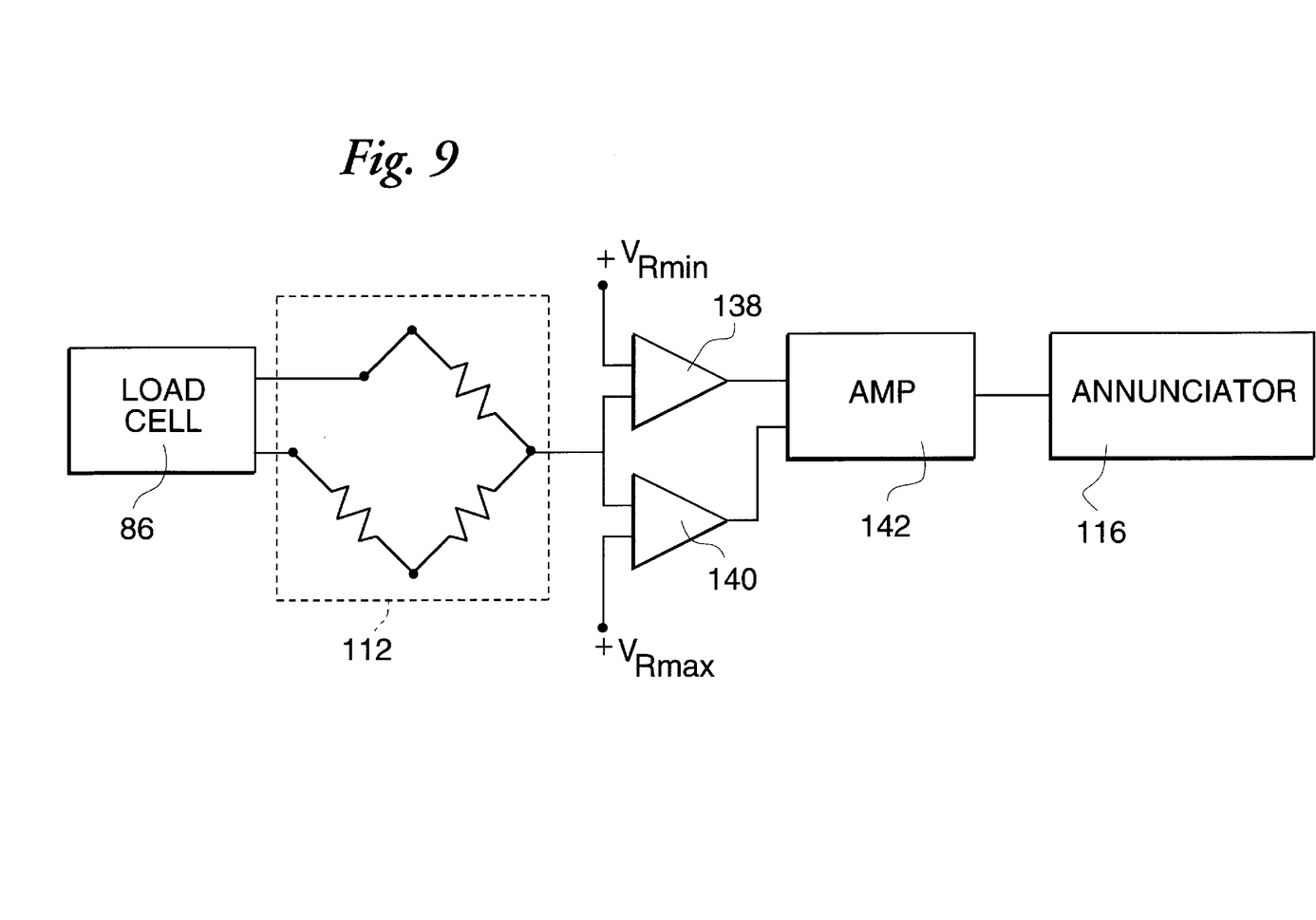
FIG. 9 is a schematized block diagram of an alternate implementation of the stabilization system.

It should also be appreciated that the stabilization system of the present invention should not be construed as being limited to processor implemented equipment control systems. For example, illustrated in FIG. 9 is a circuit for actuation of the annunciator 116. The stabilization system depicted therein comprises a transducer 86 coupled to a Wheatstone bridge 112. The output of the bridge 112 is received at an input of a pair of comparators, a minimum load comparator 138 and a maximum load comparator 140.

The comparator 138 compares the Wheatstone bridge voltage level output with a minimum reference value and generates a high output signal when the input level is below the minimum reference value $V_{R\ min}$. The comparator 140 receives the bridge output signal and compares the signal voltage level with a maximum reference level $V_{R\ max}$. If the bridge output voltage level is above the maximum reference value, the comparator 140 generates a high output signal. The outputs of the comparators 138, 140 are received at an amplifier and the amplifier output actuates the annunciator 116.

Further, the stabilization system is not limited to applications with load handling equipment, for example, the system may be utilized in a vehicle subject to lateral tip over during operation, e.g. a sports utility vehicle. In such instances, transducers are utilized as weight sensors in connection with one or more vehicle wheels to sense an approaching condition wherein the wheel is about to be lifted from a roadway or other terrain which the vehicle is traversing. The transducer output is employed for annunciator actuation, for example, as depicted in FIG. 9 or, in a processor implementation, to actuate stabilizing control responses, e.g. reduce vehicle speed, apply vehicle brakes.

Thus it will be seen that there is provided a stabilization system which achieves the various aspects, features and considerations of the present invention and which is well suited to meet the conditions of practical usage.

As various changes might be made in the present invention without departing from the spirit thereof, it is to be understood that all matter herein described or shown in the accompanying drawings is to be interpreted as illustrative and not in a limiting sense. For example, the load cell transducer need not be positioned about a steer wheel spindle but may be placed at any strategic location to measure the weight load on a support member. In a vehicle with a spring suspension, the cell may be attached to a suspension member such as a leaf spring, coil spring or torsion bar.

Further, load cell transducers need not be employed in all applications. Suitable fluidic or even optical transducers may be utilized. In vehicles with fluidic shock absorbers, for example, a fluid pressure transducer may be employed.

Having thus described the invention, there is claimed as new and desired to be secured by Letters Patent:

1. A vehicle stabilization system for warning an operator of an approaching tip over condition, the vehicle including a plurality of wheels, the system including a transducer associated with at least one wheel, the one wheel comprising a steer wheel mounted for rotation about a horizontal axle and mounted for swivel about a vertical axis by a spindle carried in a socket fixed to the vehicle, the transducer comprising an annular load cell, the spindle extending through the transducer, the transducer being carried in the socket and being subject only to axial compressive load representing at least a portion of the weight load carried by the steer wheel, the weight load varying as a function of vehicle stability, an annunciator for warning the operator of an approaching tip over condition and an electrical circuit interconnecting the transducer and the annunciator, the electrical circuit actuating the annunciator when the sensed weight load is less than a minimum value.

2. A vehicle stabilization system for warning an operator of an approaching tip over condition as constructed in accordance with claim 1 including a further transducer, the further transducer associated with a further wheel of the plurality of wheels, the further transducer sensing at least a portion of the vehicle weight load carried by the further wheel, the electrical circuit means being interconnected between the further transducer and the annunciator and actuating the annunciator when the sensed weight load at the further wheel is less than a minimum value.

3. A vehicle stabilization system for warning an operator of an approaching tip over condition as constructed in accordance with claim 1 wherein the electrical circuit includes a Wheatstone bridge.

4. A vehicle stabilization system as constructed in accordance with claim 3 wherein the electrical circuit includes a comparator, the transducer having an output coupled to the Wheatstone bridge, the Wheatstone bridge having an output coupled to the comparator, the electrical circuit further including a reference minimum voltage level, the minimum voltage level being received at the comparator, the comparator generating an output signal when the output of the Wheatstone bridge is less than the reference voltage level, the electrical circuit interconnecting the comparator output with the annunciator.

5. A vehicle stabilization system for warning an operator of an approaching tip over condition as constructed in accordance with claim 1 wherein the electrical circuit includes a processor.

6. A stabilization system for load handling equipment, the equipment comprising a lift truck, the lift truck being positioned on a support surface, at least one wheel comprising a support member between the lift truck and the support surface, the wheel comprising a steer wheel mounted for rotation about a horizontal axle and mounted for steering swivel about a vertical axis by a spindle, the spindle being carried in a socket fixed to the lift truck, the stabilization system including a transducer associated with the support member, the transducer comprising an annular load cell, the spindle extending through the transducer, the transducer being carried in the socket and being subject only to axial compressive load, the transducer sensing at least a portion of the weight carried by the support member, the sensed portion of weight varying as a function of truck stability and means interconnected to the transducer for preventing tip over by overriding truck response to destabilizing throttle positions selected by an operator when the sensed weight is beyond a predetermined value.

7. A method of maintaining stability of load handling equipment on a support surface, the equipment including at least one support member positioned between the equipment and the support surface, the load handling equipment traversing the support surface at a current travel speed, the method including the steps of:

(a) sensing the value of at least a portion of the equipment weight carried by the support member;

(b) when the sensed value passes a first predetermined value indicative of an approaching tip over in a forward direction, annunciating a warning signal and preventing equipment response to operator control settings which would increase forward tip over instability; and (c) when the sensed value passes a second predetermined value indicative of an approaching tip over in a rearward direction, annunciating a warning signal and preventing equipment response to operator control settings which would increase rearward tip over instability the step of preventing equipment response to operator control settings in step (b) and in step (c) including the step of limiting equipment travel speed to the current travel speed.

* * * * *